(12) United States Patent
Takahara (10) Patent No.: US 9,694,548 B2
(45) Date of Patent: Jul. 4, 2017

(54) PUNCTURE REPAIR DEVICE (71) Applicant: The Yokohama Rubber Co., LTD., Minato-ku, Tokyo (JP)

(72) Inventor: Hideyuki Takahara, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/654,495

(22) PCT Filed: Nov. 28, 2013

(86) PCT No.: PCT/JP2013/082056
§ 371 (c)(1),
(2) Date: Jun. 19, 2015

(87) PCT Pub. No.: WO2014/097847
PCT Pub. Date: Jun. 26, 2014

(65) Prior Publication Data
US 2015/0343724 A1    Dec. 3, 2015

(30) Foreign Application Priority Data
Dec. 20, 2012 (JP) ................. 2012-278471

(51) Int. Cl.
B65B 31/00 (2006.01)
B29C 73/02 (2006.01)
B29C 73/24 (2006.01)
B29C 73/16 (2006.01)

(52) U.S. Cl.
CPC .......... B29C 73/025 (2013.01); B29C 73/166 (2013.01); B29C 73/24 (2013.01)

(58) Field of Classification Search
CPC .... B29C 73/025; B29C 73/166; B60C 29/062
USPC .................... 141/38, 313; 137/223
See application file for complete search history.

(56) References Cited

U.S. PATENT DOCUMENTS

| | | | |
|---|---|---|---|
| 6,968,869 B2 | 11/2005 | Eckhardt | |
| 2004/0216806 A1 | 11/2004 | Eckhardt | |
| 2011/0011217 A1* | 1/2011 | Kojima | ................. B29C 73/166 81/15.2 |
| 2013/0000777 A1 | 1/2013 | Kojima et al. | |
| 2013/0199666 A1* | 8/2013 | Nakao | ................... B29C 73/166 141/38 |

FOREIGN PATENT DOCUMENTS

| | | |
|---|---|---|
| DE | 195 45 935 | 1/1997 |
| EP | 1 123 795 | 8/2001 |
| JP | 2005-145076 | 6/2005 |
| JP | 2010-36412 | 2/2010 |
| JP | 2010-036412 | 2/2010 |

(Continued)

OTHER PUBLICATIONS

International Search Report for International Application No. PCT/JP13/82056 dated Jan. 14, 2014, 4 pages, Japan.

*Primary Examiner* — Jason K Niesz
(74) *Attorney, Agent, or Firm* — Thorpe North & Western (57) ABSTRACT

A puncture repair device comprises a compressor and a vessel supplied with compressed air by the compressor and containing puncture repair liquid to be pumped to a cavity of a tire. The puncture repair liquid is heated by the heat generated by the compressor.

9 Claims, 8 Drawing Sheets (56) References Cited

FOREIGN PATENT DOCUMENTS

| JP | 2010-167716 | 8/2010 |
|----|-------------|--------|
| JP | 2010-194771 | 9/2010 |
| JP | 2010-253722 | 11/2010 |
| JP | 2011-126185 | 6/2011 |
| KR | 10-2012-0088775 | 8/2012 |
| WO | WO 00/21875 | 4/2000 |
| WO | WO 2011/055632 | 5/2011 |

\* cited by examiner

PUNCTURE REPAIR DEVICE

TECHNICAL FIELD

The present technology relates to a puncture repair device for repairing a punctured tire.

BACKGROUND

A puncture repair device is known for use upon puncture of a tire, in which compressed air generated by a compressor is used to pour puncture repair liquid into a cavity of the punctured tire, serving to fill a puncture hole and additionally fill the tire with air to a predetermined internal pressure (see, for example, Japanese Unexamined Patent Application Publication No. 2005-145076A). Mounting such a puncture repair device in a vehicle eliminates the need to mount a spare tire in the vehicle, which can achieve resource saving and reduce the vehicle weight. As a further merit, the space provided in the vehicle for mounting the spare tire is made available for other purposes.

However, the puncture repair device may be used in low-air-temperature environments (e.g., at −40° C.). In such an environment, the low temperature causes the viscosity of the puncture repair liquid to increase. Accordingly, in low-air-temperature environments, it may take a long time to pour the puncture repair liquid into the tire, and thus to repair the punctured tire in comparison to a room temperature environment (e.g. at 20° C.).

SUMMARY

The present technology provides a puncture repair device capable of reducing the time to repair a punctured tire in low-air-temperature environments.

In order to resolve the above described problem, according to the present technology, provided is a puncture repair device including:

a compressor; and a vessel supplied with compressed air by the compressor, and containing puncture repair liquid to be pumped to a cavity of a tire;

the puncture repair liquid being heated by heat generated by the compressor.

That is, the heat generated by the compressor heats the puncture repair liquid and thus lowers the viscosity thereof.

According to the present technology, the time required to repair a punctured tire is reduced in low-air-temperature environments.

DETAILED DESCRIPTION OF THE TECHNOLOGY

First Embodiment

A puncture repair device 1 according to a first embodiment is described below with reference to FIG. 1.

Figure 1:
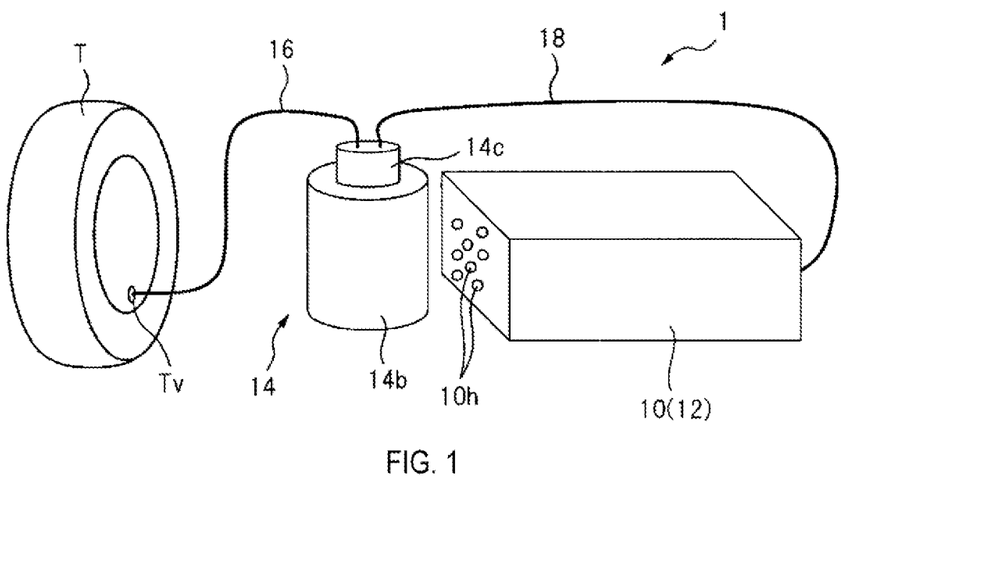
FIG. 1 is a schematic view of a puncture repair device according to a first embodiment.

FIG. 1 is a schematic view illustrating the puncture repair device 1 according to the first embodiment. The puncture repair device 1 according to the first embodiment is provided with a compressor 12 housed within a housing 10, a vessel 14 supplied with compressed air from the compressor 12, and a first hose 16 connecting an interior of the vessel 14 to a cavity of a tire T.

Although not specifically illustrated, the housing 10 may be provided with a handle for carrying, a pressure gauge for displaying internal pressure of the tire T, and the like.

In the first embodiment, the compressor 12 is a reciprocating compressor including a cylinder and a motor. Operation of the compressor 12 generates heat from the compressor 12 due to compression of air, driving of the motor, and the like. In the present technology, this heat generated from the compressor 12 is used to heat the puncture repair liquid inside the vessel. The compressor 12 is a reciprocating type of compressor in the first embodiment. However, another type of compressor, such as a rotary compressor, may also be used, as long as it includes components generating heat.

Also, a power supply for the compressor 12 may be taken from a cigarette lighter (accessory) socket inside the vehicle, or may be taken directly from a vehicle battery. Alternatively, the power supply may be taken from a battery separately prepared other than the vehicle battery.

Returning to FIG. 1, the vessel 14 includes a main body 14b substantially cylindrical with an opening at the top, and a cap 14c attached to the opening of the main body 14b. The compressed air and the puncture repair liquid flow in and out of the vessel 14 through the opening. The vessel 14 contains the puncture repair liquid to be pumped into the cavity of the tire T. Also, the compressor 12 and the interior of the vessel 14 are connected by a second hose 18 passing through the cap 14c. Thereby, the compressed air generated by the compressor 12 is supplied to the interior of the vessel 14.

The cap 14c is attached to the opening of the main body 14b through which the puncture repair liquid passes, hermetically sealing the vessel 14. In the first embodiment, the cap 14c is attached with screws to the main body 14b, and thus to the opening of the vessel 14. However, the cap 14c may be attached to the main body 14b by any means, as long as the vessel 14 remains hermetically sealed and withstands the pressure of the compressed air generated by the compressor 12.

Prior to attaching the cap 14c, an aluminum seal is attached to the opening of the vessel 14, for example, thus preventing exposure of the puncture repair liquid contained within the vessel 14 to the outside air. Furthermore, this aluminum seal may be, for example, broken by a blade (not illustrated in the drawing) provided on the cap 14c, when attaching the cap 14c.

The first hose 16 passes through the cap 14c, with one end of the first hose 16 positioned at an inner bottom of the vessel 14 in order to pump the puncture repair liquid contained within the vessel 14 in entirety to the tire T. Another end of the first hose 16 is attached to a valve Tv of the tire T. Accordingly, the interior of the vessel 14 is connected to the cavity of the punctured tire T via the first hose 16. Thereby, the puncture repair liquid pumped by the compressor 12 passes through the inside of the first hose 16 and is poured into the cavity of the punctured tire T.

With reference to FIG. 1, an opening 10h as a heat radiator is provided on the housing 10. In the first embodiment, a multitude of small holes form the opening 10h. Providing the opening 10h on the housing 10 serves to dissipate the heat generated by the compressor 12 housed within the housing 10 to the outside of the housing 10 through the opening 10h, which transfers the heat to the vessel 14 arranged adjacent to the opening 10h.

In the first embodiment, a multitude of small holes form the opening 10h. The size and quantity of the holes in the opening 10h vary in accordance with the actual size of the vessel 14, the respective capacities of the compressor 12 and of the motor thereof, and the like. For instance, the optimal size and quantity are preferably determined by experimentation. Alternatively, the heat radiator may be a mesh (net) having any mesh size. Furthermore, the heat radiator can be any type which may transfer the heat generated by the compressor 12 contained within the housing 10 in any manner.

In addition, with reference to FIG. 1, the vessel 14 is arranged adjacent to the opening 10h. Accordingly, the heat generated by the compressor 12 within the housing 10 is transferred to the vessel 14. Furthermore, a fan may be located adjacent to the opening 10h to transfer the heat within the housing 10 from the opening 10h to the outside of the housing 10.

The operations of the puncture repair device 1 according to the first embodiment will be described next.

First, the compressor 12 is driven to pump the compressed air from the compressor 12 through the second hose 18 to the interior of the vessel 14. Subsequently, the puncture repair liquid contained within the vessel 14 is poured into the cavity of the punctured tire T, along with the compressed air, through the first hose 16. As a result, the puncture repair liquid flows into a puncture hole and is able to close the puncture hole. Afterward, additional compressed air fills the tire until a pressure reaches a predetermined value therein.

In the first embodiment, the vessel 14 is disposed adjacent to the opening 10h, which enables by the heat transferred from the opening 10h to heat the puncture repair liquid contained within the vessel 14 through the vessel 14. As a result, even when the puncture repair device 1 is used under low-air-temperature environments, the viscosity of the puncture repair liquid may decrease thereby reducing the time for repairing the puncture of the tire T.

Here, the vessel 14 may be composed of comparatively inexpensive material such as PP or PET. However, it is preferable that a portion of the vessel 14 to which the heat from the compressor 12 is transferred, i.e., the portion facing the opening 10h of the housing 10 in the first embodiment, is composed of a thermally conductive material. As a result, the puncture repair liquid can be heated more efficiently, which becomes advantageous. Alternatively, the vessel 14 may be entirely composed of a thermally conductive material.

In the present technology, the thermally conductive material refers to a material with a thermal conductivity from 15 to 500 $W \cdot m^{-1} \cdot K^{-1}$. For example, a metal (copper, silver, iron, stainless steel, and the like), silicone, or graphite may be applicable.

Second Embodiment

Next, a puncture repair device 1 according to a second embodiment will be described with reference to FIGS. 2 to 4. Only the differences from the first embodiment will be described.

Figure 2:
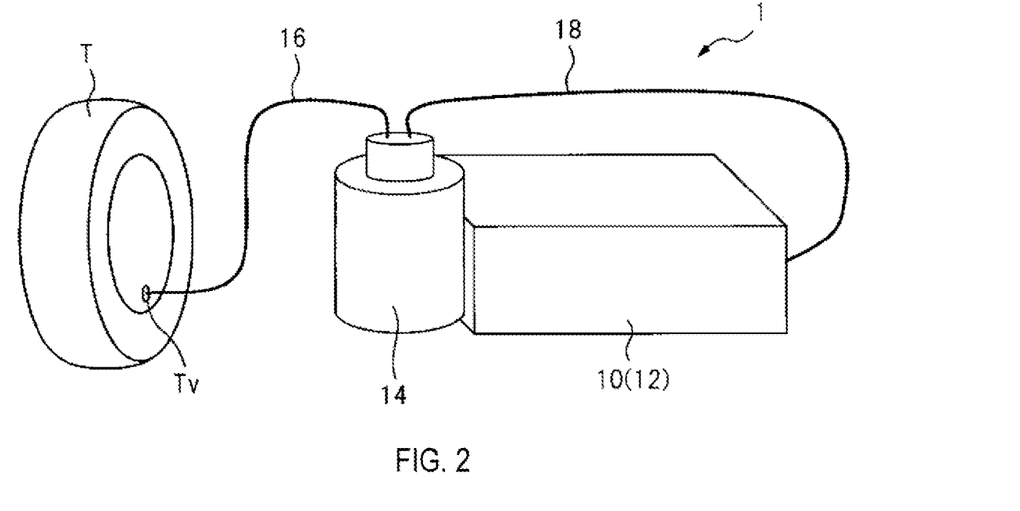
FIG. 2 is a schematic view of a puncture repair device according to a second embodiment.

FIG. 2 is a schematic view of the puncture repair device 1 according to the second embodiment. In addition, FIG. 3 is a partial schematic top view of the puncture repair device 1 according to the second embodiment. As illustrated in FIGS. 2 and 3, in the second embodiment, the vessel 14 is in direct contact with the housing 10. Also, as particularly illustrated in FIG. 3, in order to increase the contact area of the housing 10 with the vessel 14, a curved portion 10t is formed on a side of the housing 10 so as to accommodate a side of the vessel 14.

Figure 3:
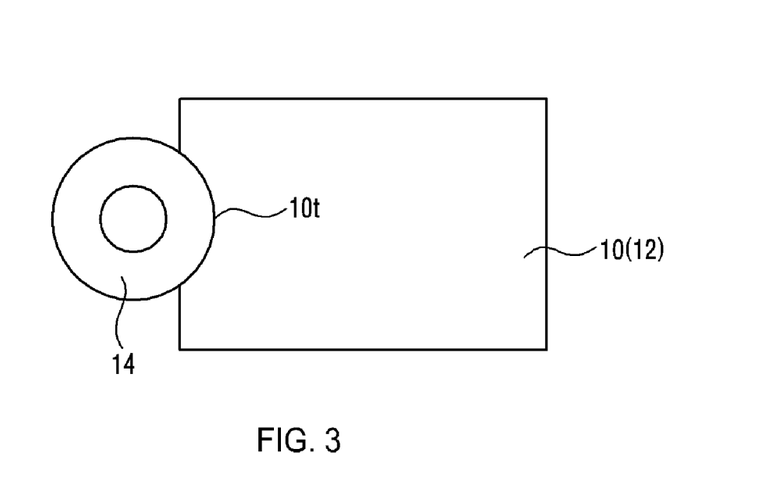
FIG. 3 is a partial schematic top view of the puncture repair device according to the second embodiment.
Figure 4:
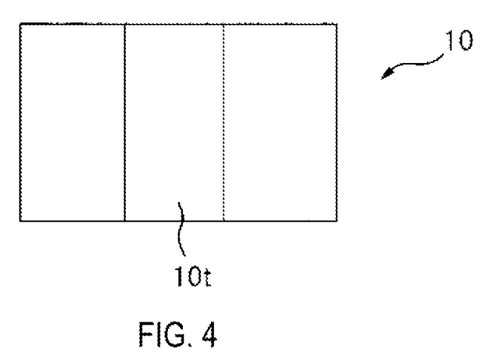
FIG. 4 is a side view of a housing illustrated in FIG. 3, viewed from a side in contact with a vessel.

FIG. 4 is a side view of the housing 10 illustrated in FIG. 3, when viewed from the side in contact with the vessel 14. In the second embodiment, the portion 10t, where the housing 10 is in contact with the vessel 14, is formed of the thermally conductive material described above. Accordingly, the heat generated by the compressor 12 is transferred to the outside of the housing 10 through the thermally conductive material provided at the portion 10t where the housing 10 is in contact with the vessel 14.

The puncture repair device 1 according to the second embodiment, by the configuration described above, transfers the heat generated by the compressor 12 contained within the housing 10 to the portion 10t composed of the thermally conductive material. Accordingly, the puncture repair liquid may be heated through the vessel 14 in direct contact with the portion 10t.

In each embodiment, although the vessel 14 is substantially cylindrical in shape, no such limitation to the shape of the vessel 14 is intended. For example, the vessel 14 may be assumed to have a rectangular shape, where the portion 10t of the housing 10 composed of the thermally conductive material is preferably shaped flat in order to increase the surface contact area with the vessel 14. Thus, preferably, the shape of the portion 10t of the housing 10 composed of the thermally conductive material is shaped to maximize the surface contact area with the vessel 14.

Third Embodiment

Next, a puncture repair device 1 according to a third embodiment will be described with reference to FIGS. 5 to 7. Only the differences from the first embodiment will be described.

Figure 5:
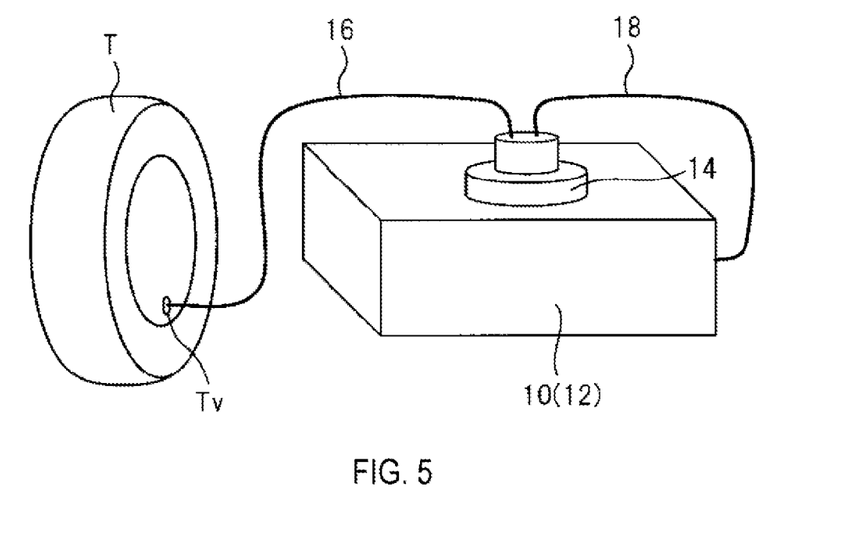
FIG. 5 is a schematic view of a puncture repair device according to a third embodiment.
Figure 6:
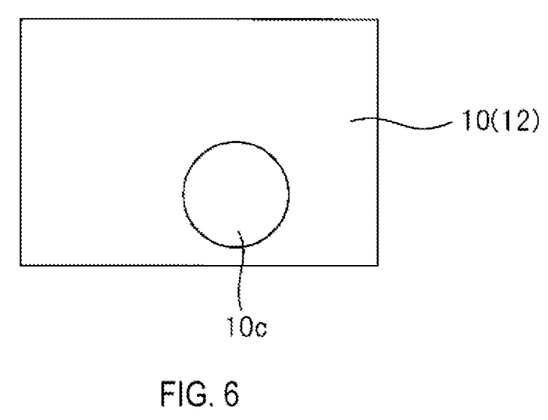
FIG. 6 is a schematic top view of a housing illustrated in FIG. 5.

FIG. 5 is a schematic view of a puncture repair device 1 according to the third embodiment. FIG. 6 is a schematic top view of the housing 10 illustrated in FIG. 5. With reference to FIGS. 5 and 6, in the third embodiment, a vessel insertion opening 10c is formed on the housing 10, and the vessel 14 is inserted into the housing 10 through the vessel insertion opening 10c.

The vessel insertion opening 10c has a shape that is substantially complementary to a horizontal cross-section of the vessel 14. As a result, almost no clearance is formed between a periphery of the vessel insertion opening 10c and a perimeter of the vessel 14, so that the heat generated by the compressor 12 within the housing 10 does not escape to the outside of the housing 10 through the clearance.

The puncture repair device 1 according to the third embodiment, by the configuration described above, directly transfers the heat generated by the compressor 12 contained within the housing 10 to a portion of the vessel 14 positioned inside the housing 10. Accordingly, the puncture repair liquid can be heated through the vessel 14. At least a partial insertion of the vessel 14 into the housing 10 may be enough to accomplish the purpose of reducing the time for repairing the punctured tire T by heating the puncture repair liquid.

MODIFIED EXAMPLE

Figure 7:
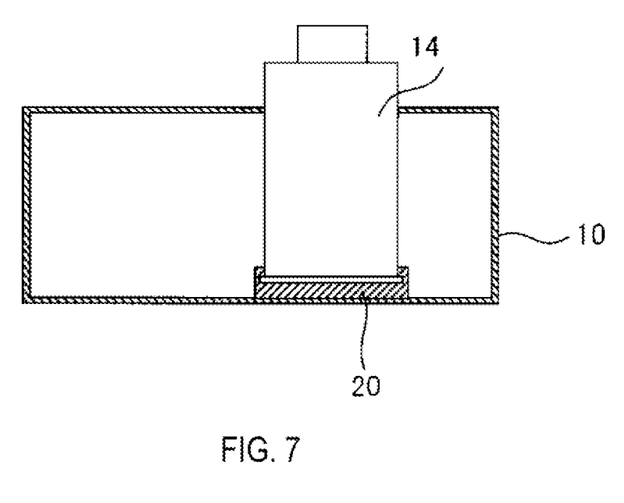
FIG. 7 is a partial cross-sectional schematic view of a puncture repair device according to a modified example of the third embodiment.

FIG. 7 is a partial cross-sectional schematic view of a puncture repair device 1 according to a modified example of the third embodiment. With reference to FIG. 7, the modified example provides the puncture repair device 1 with a seat 20 as a fixing tool configured to fix the vessel 14 within the housing 10. Moreover, FIG. 7 illustrates a cross-sectional view of the housing 10 and the seat 20, omitting the compressor 12.

In this modified example, the seat 20 is attached to an interior base of the housing 10. When the vessel 14 is inserted into the housing 10 through the vessel insertion opening 10c, the vessel 14 is fixed into place by snap fitting of a bottom of the vessel 14 with the seat 20.

The modified example illustrated in FIG. 7 uses the seat 20 as a fixing tool to fix the vessel 14 thereon by snap-fitting as an example. However, the seat 20 may also include an adhesive portion on a top face and fix the vessel 14 on the seat by adhesion. Alternatively, a surface fastener may be installed on a top face of the seat 20 and under a bottom face of the vessel 14 and fix the vessel 14 to the seat 20. Alternatively, in case that the vessel 14 is formed of a metal, the seat 20 may be a magnet and fix the vessel 14 into place by magnetic force. In short, any method of fixing the vessel 14 into place within the housing 10 is applicable.

Furthermore, it is more preferable that the fixing tool may be composed of the thermally conductive material described above. This enables the heat to be transferred to the vessel 14 through the fixing tool in contact with the vessel 14, thereby heating the puncture repair liquid through the vessel 14.

Fourth Embodiment

Next, a puncture repair device 1 according to a fourth embodiment will be described with reference to FIG. 8. Only the differences from the third embodiment will be described. The fourth embodiment is an embodiment more preferable than the third embodiment.

Figure 8:
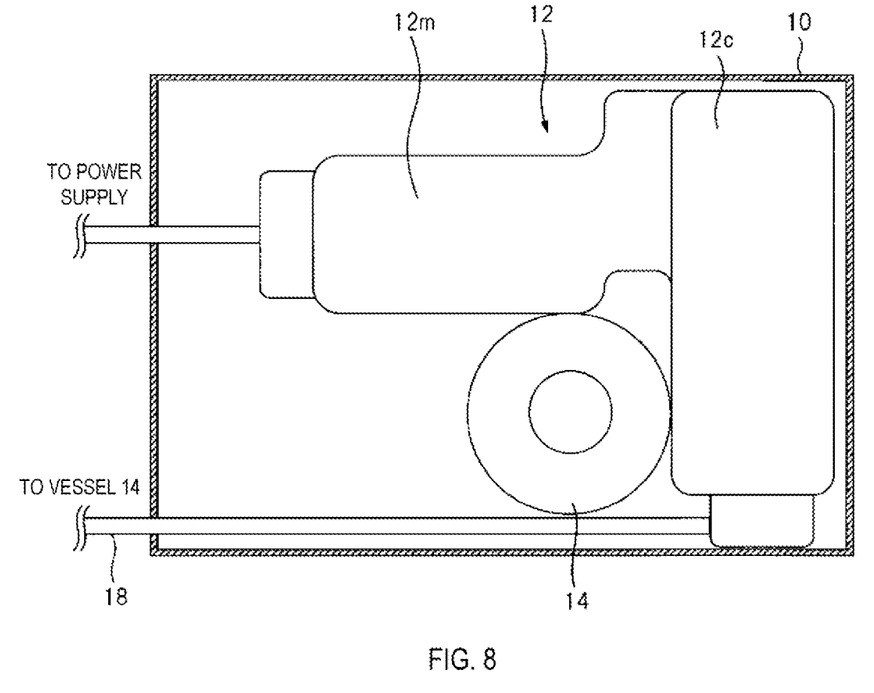
FIG. 8 is a partial cross-sectional schematic top view of a puncture repair device 1 according to a fourth embodiment.

FIG. 8 is a partial cross-sectional schematic top view of the puncture repair device 1 according to the fourth embodiment of the present technology. Furthermore, only the cross-sectional view of the housing 10 is illustrated in FIG. 8. With reference to FIG. 8, in the fourth embodiment, the vessel 14 is inserted into the housing 10 through the vessel insertion opening 10c, and arranged in direct contact with the compressor 12, specifically with one or both of a cylinder 12c and a motor 12m.

The compressor of the fourth embodiment is, just like the first embodiment, a reciprocating compressor that includes a cylinder 12c and a motor 12m. With reference to FIG. 8, in the fourth embodiment, the vessel 14 is in direct contact with the cylinder 12c and the motor 12m. As the cylinder 12c and the motor 12m are the main heat-generating components of the compressor 12, it is preferable that one or both of these components may be in direct contact with the vessel 14. It is because the heat generated by the compressor 12 is transferred to the vessel 14, thus enabling to heat the puncture repair liquid contained within the vessel 14.

However, in the fourth embodiment as well as in the first embodiment, the compressor 12 may also be another type of compressor, such as a rotary compressor, as long as it includes components generating heat. In the fourth embodiment, by directly contacting the vessel 14 with the main heat-generating components of the compressor 12, the puncture repair liquid contained within the vessel 14 can be heated through the vessel 14, which may be advantageous.

Other Embodiments

In the first embodiment, it is described that the portion of the vessel 14 to which the heat is transferred from the compressor 12 may be preferably composed of a thermally conductive material. Similarly, in the second, third, and fourth embodiments, the portion of the vessel 14 to which the heat from the compressor 12 is transferred is preferably composed of the thermally conductive material. As an example, the vessel 14 may be preferably composed of the thermally conductive material for the portion in contact with the portion 10t of the housing 10 in the second embodiment, for the portion inserted into the housing 10 in the third embodiment, and for the portion in contact with the compressor 12 in the fourth embodiment. Alternatively, the vessel 14 may be entirely composed of the thermally conductive material.

Moreover, in the puncture repair device 1 according to the fourth embodiment, the fixing tool of the puncture repair device 1 according to the modified example of the third embodiment for fixing the vessel 14 within the housing 10 is preferably provided.

The present technology is defined as follows.

(1) A puncture repair device includes a compressor, and a vessel supplied with compressed air by the compressor and containing puncture repair liquid to be pumped to a cavity of a tire. The puncture repair liquid is heated by the heat generated by the compressor.

(2) The puncture repair device according to above (1) further includes a housing containing the compressor. The housing includes a heat radiator within the housing dissipating the heat generated by the compressor to the outside. The vessel is arranged adjacent to a front of the heat radiator, and the puncture repair liquid is heated by the heat dissipated from the housing.

(3) The puncture repair device according to above (1) further includes a housing containing the compressor. The vessel is in direct contact with the housing, and a portion of the housing in contact with the vessel is composed of a thermally conductive material.

(4) The puncture repair device according to above (1) further includes a housing containing the compressor. A vessel insertion opening for inserting the vessel is formed on the housing. The vessel is at least partly inserted into the housing through the vessel insertion opening and the puncture repair liquid is heated by the heat generated within the housing.

(5) The puncture repair device according to above (4) includes the vessel in direct contact with the compressor.

(6) The puncture repair device according to above (4) or (5) further includes a fixing tool configured to fix the vessel within the housing.

(7) The puncture repair device according to above (6) includes the fixing tool composed of a thermally conductive material.

(8) The puncture repair device according to any one of above (1) to (7) includes a part of the vessel that receives the heat transferred from the compressor and is composed of a thermally conductive material.

What is claimed is:

1. A puncture repair device, comprising:
   a compressor;
   a vessel supplied with compressed air by the compressor and containing puncture repair liquid to be pumped to a cavity of a tire, wherein the vessel is in direct contact with the compressor; and
   the puncture repair liquid being heated by heat generated by the compressor.

2. A puncture repair device, comprising:
   a compressor;
   a vessel supplied with compressed air by the compressor and containing puncture repair liquid to be pumped to a cavity of a tire;
   the puncture repair liquid being heated by heat generated by the compressor;
   a housing containing the compressor; and
   a fixing tool configured to fix the vessel within the housing, wherein the fixing tool is composed of a thermally conductive material.

3. The puncture repair device according to claim 2, wherein
   the vessel is in direct contact with the compressor.

4. The puncture repair device according to claim 1, further comprising
   a fixing tool configured to fix the vessel within the housing.

5. The puncture repair device according to claim 4, wherein
   the fixing tool is composed of a thermally conductive material.

6. The puncture repair device according to claim 1, wherein
   a part of the vessel receiving the heat transferred from the compressor is composed of a thermally conductive material.

7. The puncture repair device according to claim 3, wherein
   a part of the vessel receiving the heat transferred from the compressor is composed of a thermally conductive material.

8. The puncture repair device according to claim 4, wherein
   a part of the vessel receiving the heat transferred from the compressor is composed of a thermally conductive material.

9. The puncture repair device according to claim 5, wherein
   a part of the vessel receiving the heat transferred from the compressor is composed of a thermally conductive material.

* * * * *